(12) United States Patent
Harrell et al.

(10) Patent No.: US 11,862,949 B2
(45) Date of Patent: Jan. 2, 2024

(54) EXPLOSION-PROOF CONDUIT FITTING, METHOD OF USE, AND METHOD OF MANUFACTURE

(71) Applicants: John Harrell, Lee's Summit, MO (US); Frank Tanner, Lee's Summit, MI (US)

(72) Inventors: John Harrell, Lee's Summit, MO (US); Frank Tanner, Lee's Summit, MI (US)

(*) Notice: Subject to any disclaimer, the term of this patent is extended or adjusted under 35 U.S.C. 154(b) by 0 days.

(21) Appl. No.: 18/199,187

(22) Filed: May 18, 2023

(65) Prior Publication Data
US 2023/0378728 A1    Nov. 23, 2023

Related U.S. Application Data

(60) Provisional application No. 63/343,380, filed on May 18, 2022.

(51) Int. Cl.
*H02G 3/04* (2006.01)

(52) U.S. Cl.
CPC ......... *H02G 3/0406* (2013.01); *H02G 3/0462* (2013.01)

(58) Field of Classification Search
CPC ............................ H02G 3/0406; H02G 3/0462
USPC ......................................................... 138/108
See application file for complete search history.

(56) References Cited

U.S. PATENT DOCUMENTS

| | | | |
|---|---|---|---|
| 4,400,858 A * | 8/1983 | Goiffon | E21B 47/0175 24/546 |
| 4,456,784 A | 6/1984 | Klein | |
| 4,640,978 A | 2/1987 | Kilbane et al. | |
| 4,829,902 A | 5/1989 | Sharpe et al. | |
| 5,613,453 A | 3/1997 | Donovan | |
| 6,634,388 B1 * | 10/2003 | Taylor | B29C 63/34 138/104 |
| 6,834,722 B2 * | 12/2004 | Vacik | E21B 23/006 166/321 |
| 6,852,922 B2 | 2/2005 | Widman | |
| 9,790,836 B2 * | 10/2017 | Latham | F01N 1/04 |
| 10,260,666 B2 * | 4/2019 | Sumner | F16L 53/35 |
| 10,301,912 B2 * | 5/2019 | De Witt | B08B 7/0042 |
| 2008/0136120 A1 | 6/2008 | Babiarz et al. | |
| 2014/0027147 A1 * | 1/2014 | Yamamoto | H02G 3/0462 174/68.3 |
| 2014/0124261 A1 * | 5/2014 | Mizuhira | B60R 16/0215 174/110 R |
| 2014/0190742 A1 * | 7/2014 | Kajiwara | B29C 43/305 174/72 A |

(Continued)

*Primary Examiner* — Craig M Schneider
*Assistant Examiner* — David R Deal
(74) *Attorney, Agent, or Firm* — Law Office of Mark Brown, LLC; Christopher M DeBacker

(57) ABSTRACT

An explosion-proof conduit fitting configured to be placed between two pieces of electrical conduit, thereby connecting the two conduit pieces together such that electrical lines running through the two conduits also pass through the fitting. An embodiment utilizes two primary components to prevent migrations of gases and to provide the structural requirement of withstanding the extreme pressures of explosions from allowing flames and temperatures above the ignition temperature of flammable gases to pass through the hazardous area boundary: a granular fill, such as sand; and a removable gas-tight fire-stopping compound, such as an expanding closed cell foam.

15 Claims, 13 Drawing Sheets

(56) References Cited

U.S. PATENT DOCUMENTS

2017/0299090 A1* 10/2017 Pearson ............... H02G 3/0487
2022/0216682 A1* 7/2022 Movafagh ................ H02G 9/06

* cited by examiner

EXPLOSION-PROOF CONDUIT FITTING, METHOD OF USE, AND METHOD OF MANUFACTURE

CROSS-REFERENCE TO RELATED APPLICATION

This application claims priority in U.S. Provisional Patent Application No. 63/343,380 Filed May 18, 2022, which is incorporated herein by reference.

BACKGROUND OF THE INVENTION

1. Field of the Invention

The present invention relates generally to a conduit fitting and method for use thereof, and more specifically to an explosion-proof conduit fitting utilizing a combination of sand and foam to seal and secure the fitting.

2. Description of the Related Art

Electrical conduits containing wires can be the source of explosions and fire. Fittings and conduit using cured epoxy fills and other gas-tight fittings and fills have been used to prevent such disasters from occurring. However, these epoxies and other fills require permanent fixture of the fitting to the conduit, and cannot be easily adjusted for reuse. What is needed is a conduit fitting with explosion-proof capabilities that can be removed and reused as desired.

Heretofore there has not been available a system or method for an explosion-proof conduit fitting with the advantages and features of the present invention.

BRIEF SUMMARY OF THE INVENTION

The present invention generally provides an explosion-proof conduit fitting configured to be placed between two pieces of electrical conduit, thereby connecting the two conduit pieces together such that electrical lines running through the two conduits also pass through the fitting. A preferred embodiment of the present invention utilizes two primary components to prevent migrations of gases and to provide the structural requirement of withstanding the extreme pressures of explosions from allowing flames and temperatures above the ignition temperature of flammable gases to pass through the hazardous area boundary: a granular fill, such as sand; and a removable gas-tight fire-stopping compound, such as an expanding closed cell foam like the Fire Block Foam FB-Foam manufactured and sold by 3M, also known as Minnesota Mining and Manufacturing Company, of Saint Paul, MN.

The granular/fine fill material, such as sand or other granular materials, that has the property to provide resistance greater than the force or pressure applied at the end of the fill. The granular/fine fill material has the property such that pressure on one side or end of the material causes this pressure to be uniformly distributed throughout the material. This uniform distribution of pressure results in increased frictional resistance in all directions, including increased friction on the sidewalls of the fitting, preventing movement of the material, particularly if the sidewall area is greater than the area of the end receiving the pressure from an explosion. With sufficient granular fill material, the frictional resistance exceeds the applied force, effectively jamming and preventing movement of the fill. Additionally, the granular/fine fill material has the added benefit of cooling gases from an explosion below the ignition temperature of flammable gases.

The removable gas-tight compound such as a fire stopping compound or other removable gas-tight material that will fill voids and provide a gas-tight barrier. The fire-stopping compound is an expanding closed cell foam that prevents the transmission of flammable gases.

The purpose of the fitting and filling compounds is to provide a removable and maintainable explosion-proof sealing fitting. Existing fittings are filled with compounds that harden that do not allow modifications or additions of wires through the fittings and require destruction and removal of the fittings, conduit, and wiring to make modifications. The sealing compounds provide the essential functions of preventing the migration of gases outside hazardous areas and prevent any explosions or flames from migrating through the hazardous area boundaries.

BRIEF DESCRIPTION OF THE DRAWINGS

The drawings constitute a part of this specification and include exemplary embodiments of the present invention illustrating various objects and features thereof.

DETAILED DESCRIPTION OF THE PREFERRED EMBODIMENTS

I. Introduction and Environment

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning.

II. First Embodiment Explosion-Proof Conduit Fitting 2

Figure 1:
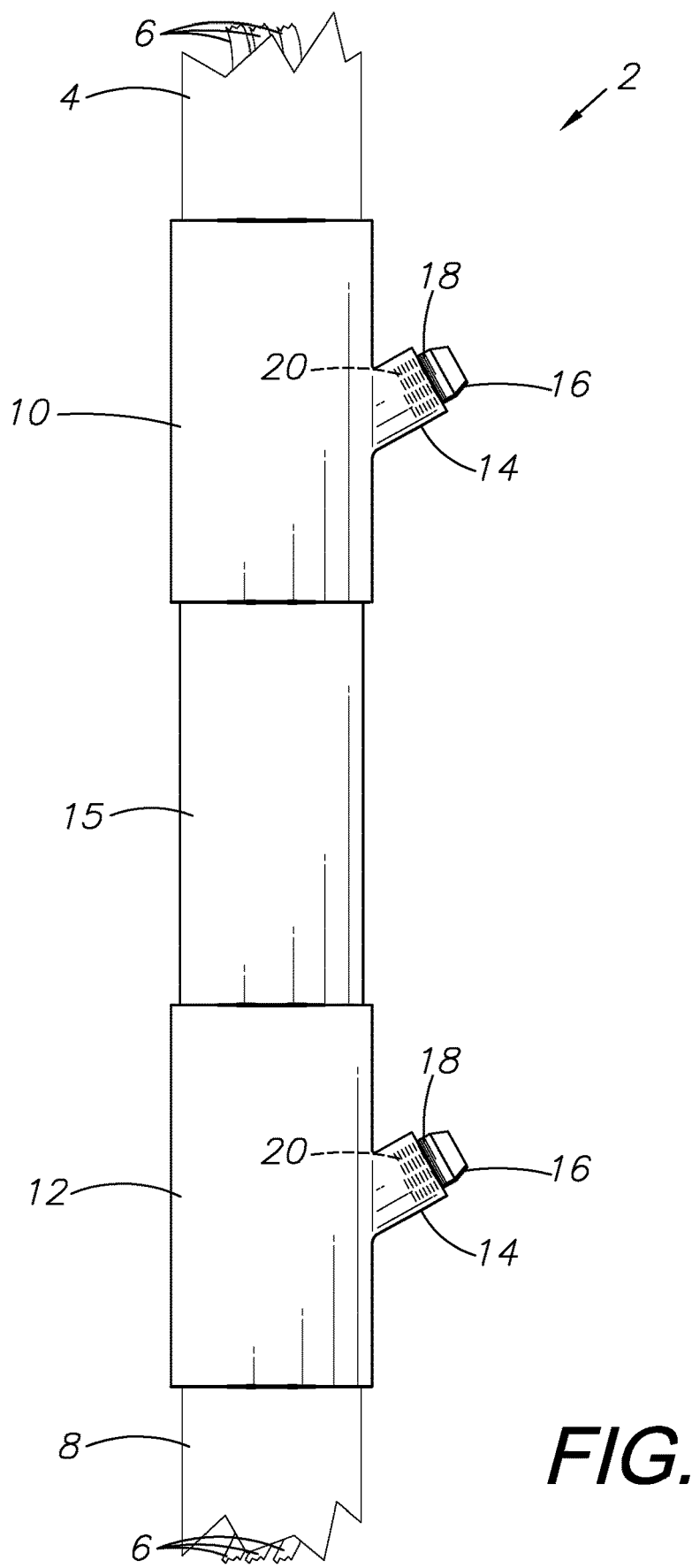
FIG. 1 is a side elevational view of a first embodiment of the present invention showing a two-part filling solution within a pair of exterior fittings joined by a central conduit.
Figure 2:
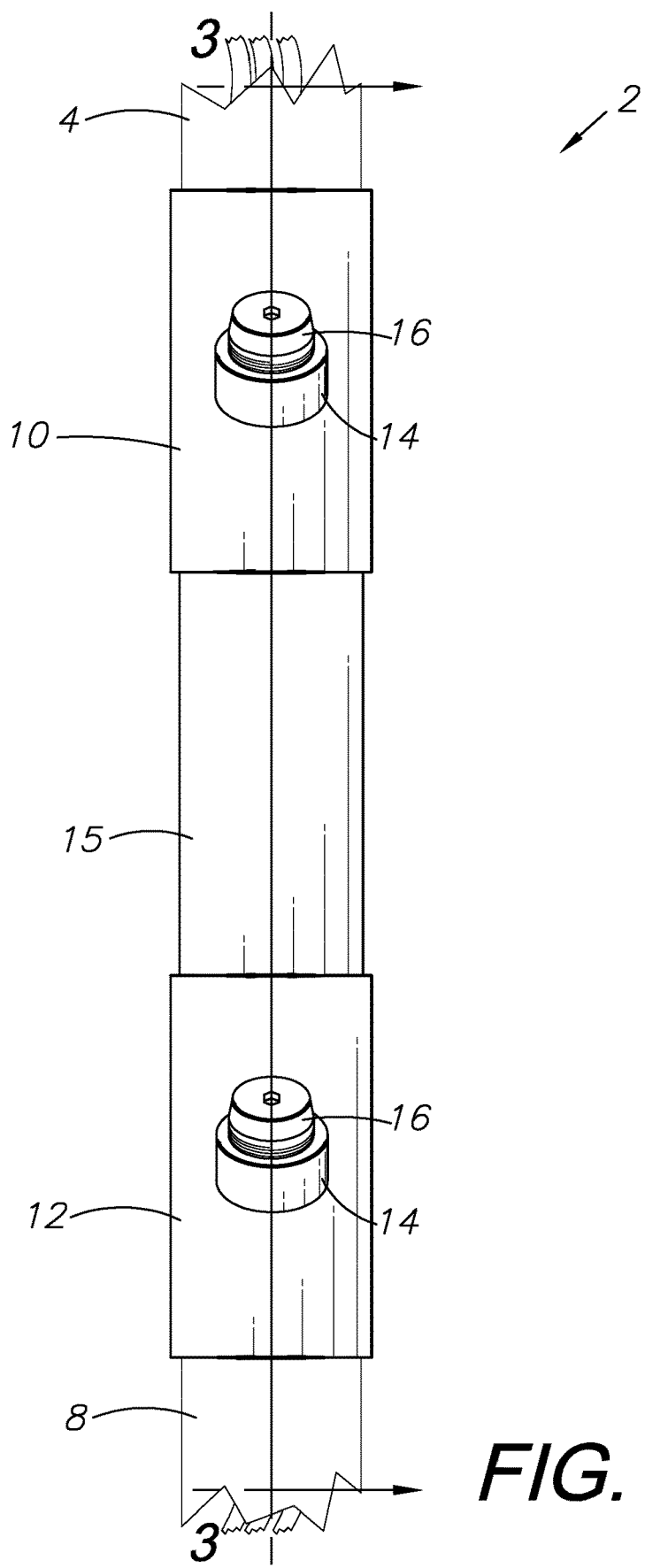
FIG. 2 is a top plan view thereof.
Figure 3:
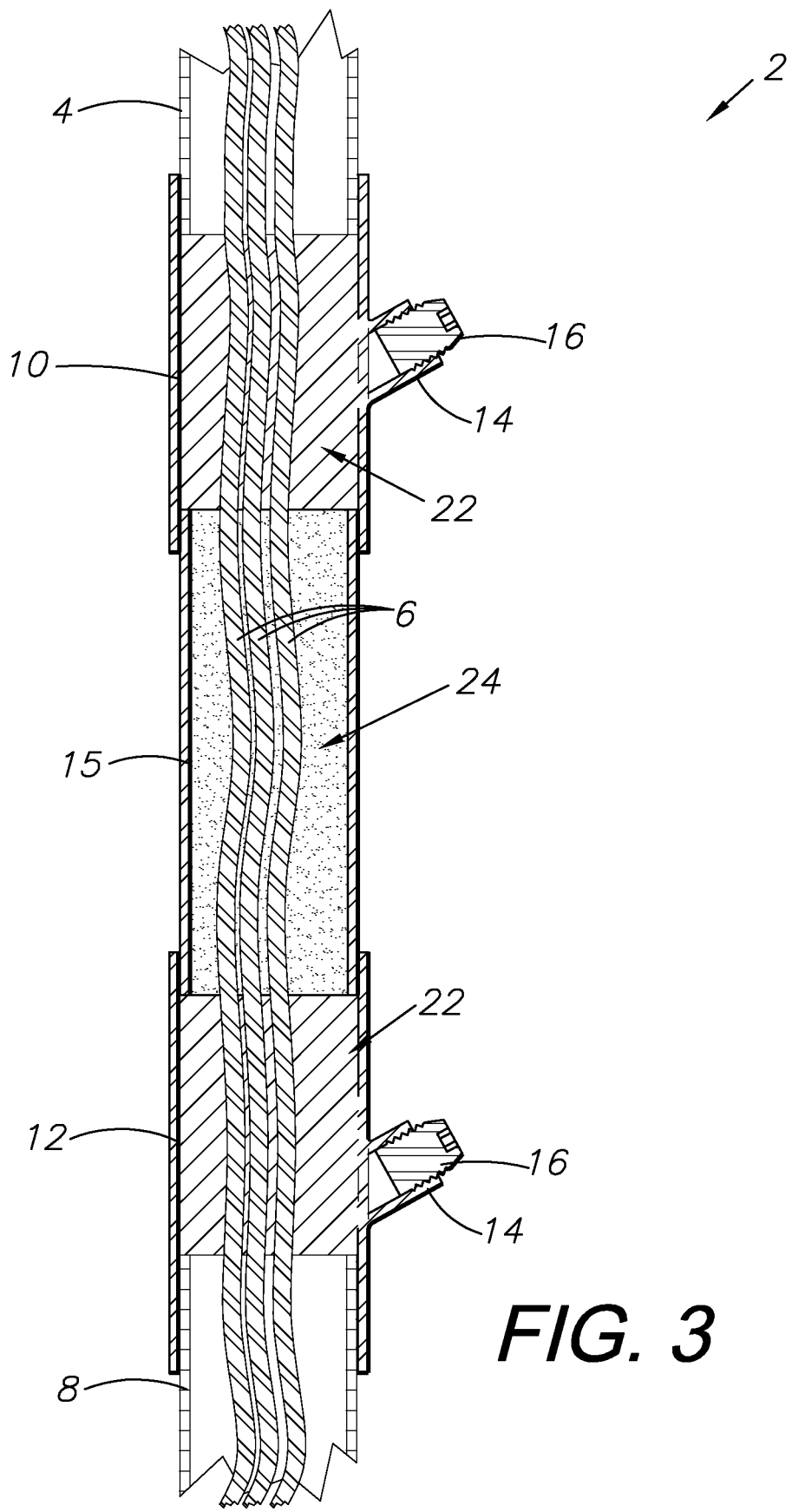
FIG. 3 is a side sectional view thereof taken about the line of FIG. 2.
Figure 4:
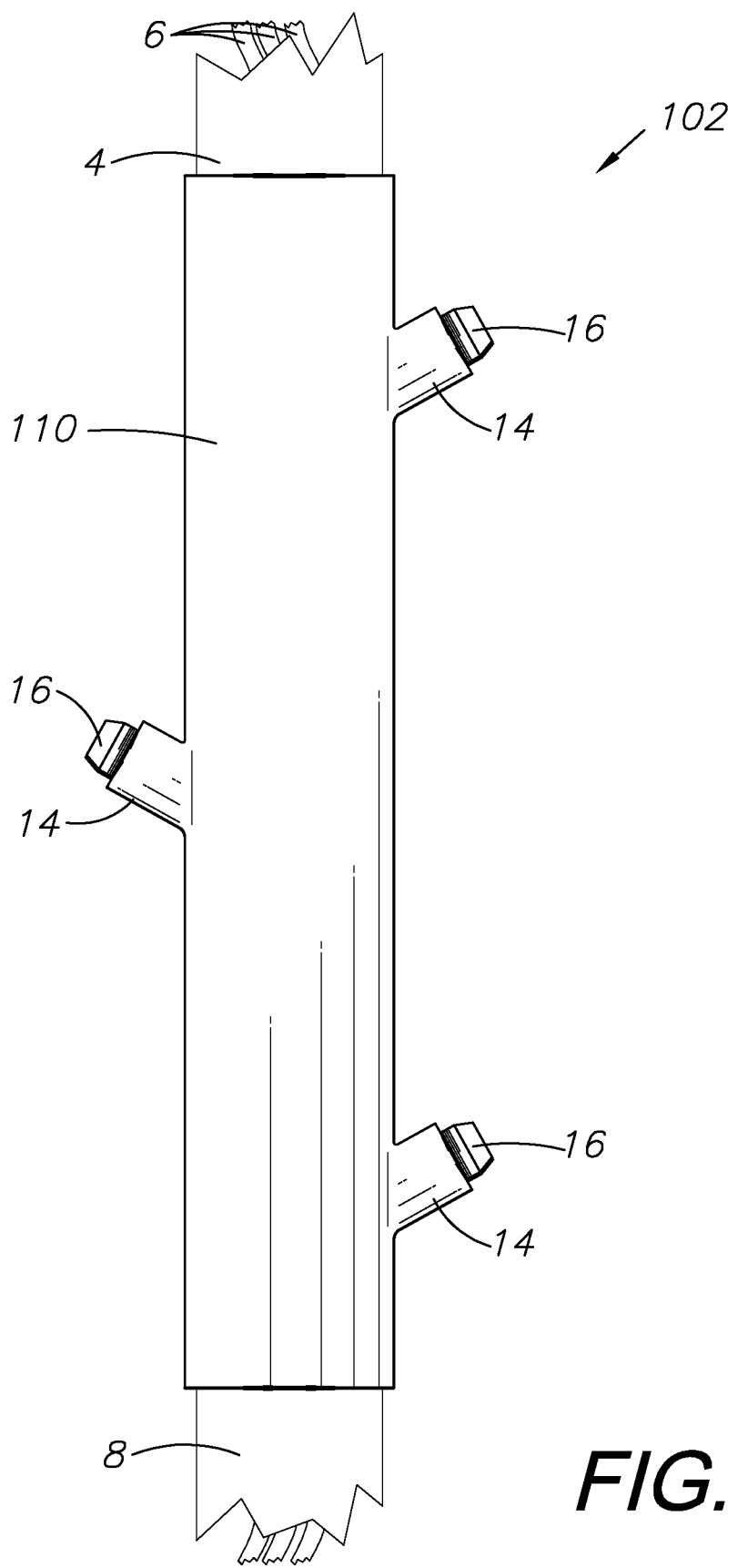
FIG. 4 is a side elevational view of a second embodiment of the present invention, where the central conduit is incorporated into the fittings.
Figure 5:
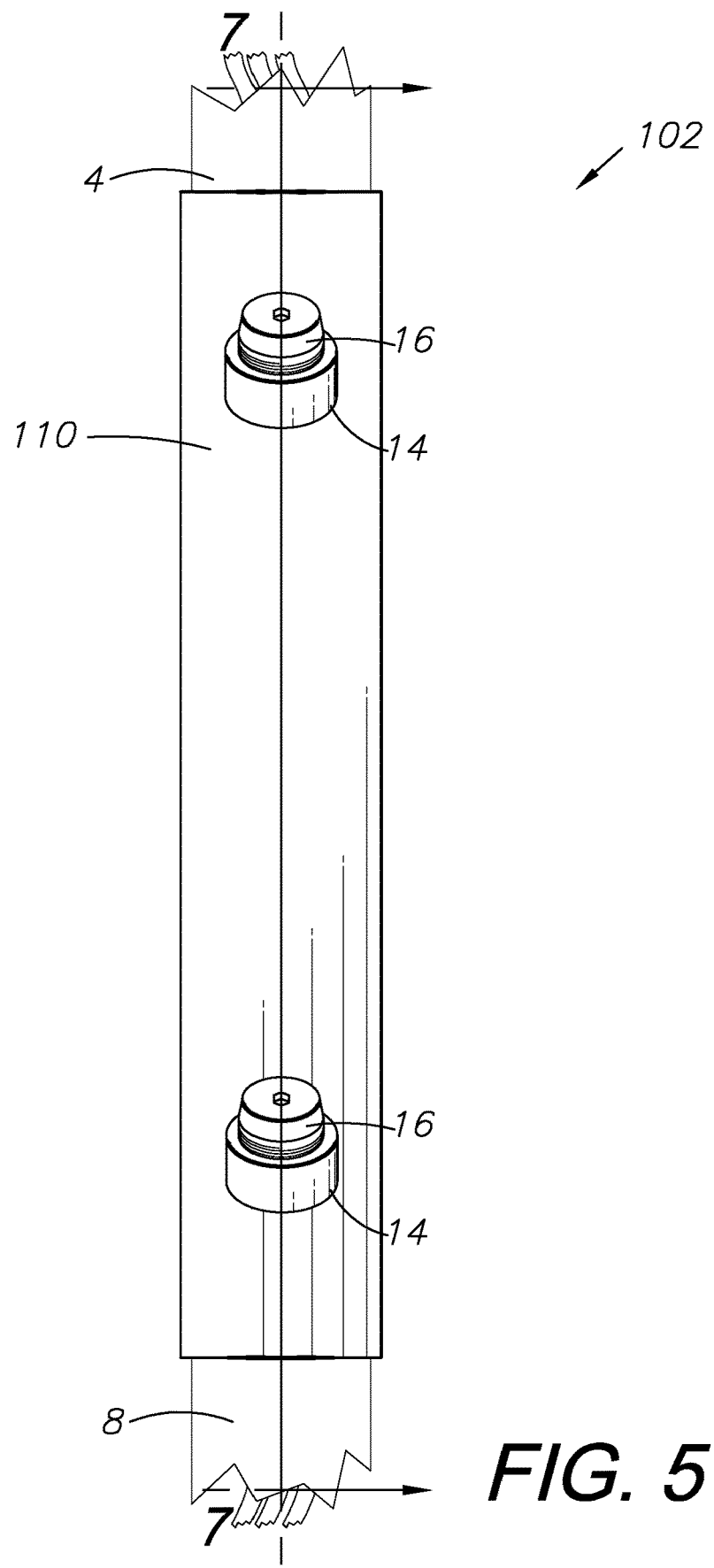
FIG. 5 is a top plan view thereof.
Figure 6:
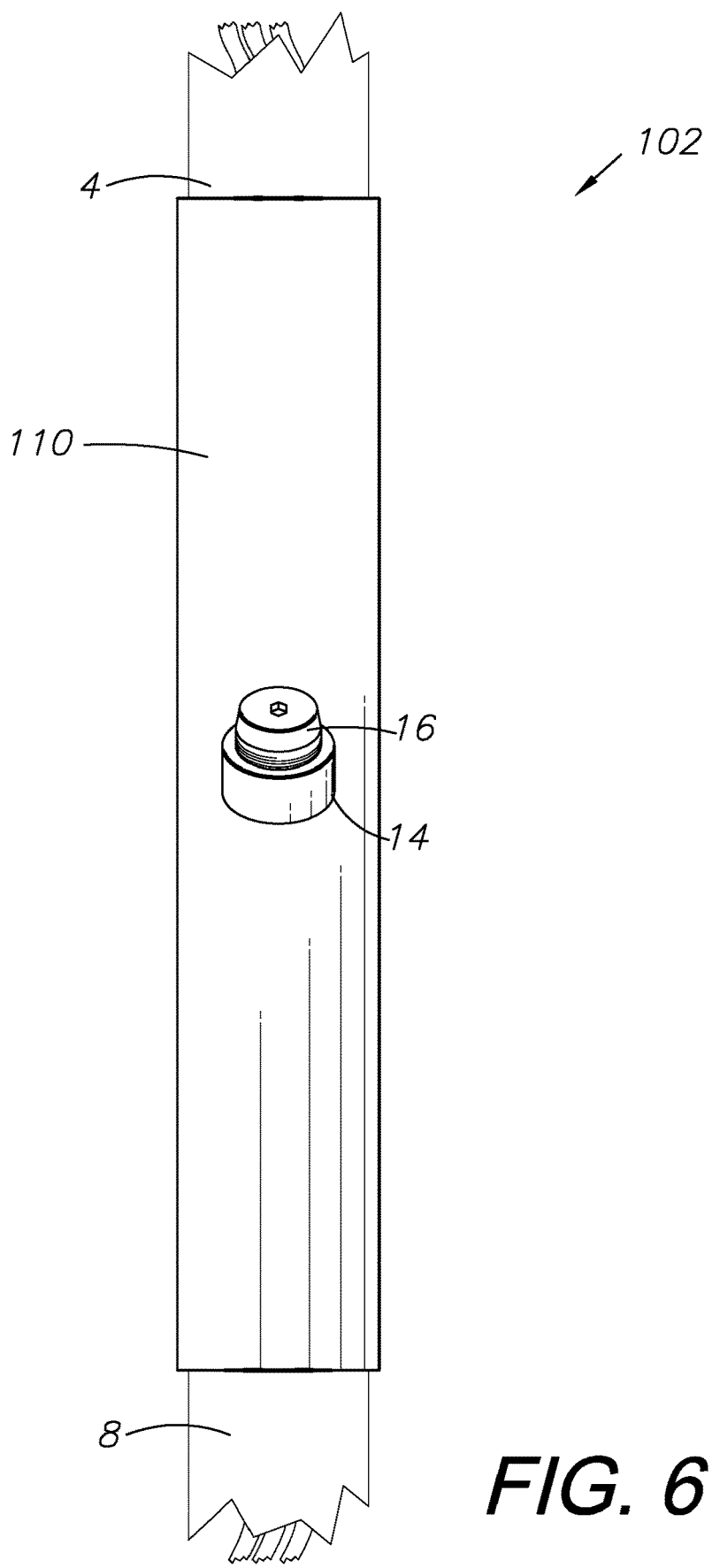
FIG. 6 is a rear plan view thereof.

FIGS. 1-3 show a first embodiment explosion-proof conduit fitting 2, where a first fitting 10 and a second fitting 12 are filled with a removable gas tight compound 22. The first and second fittings 10, 12 are joined by a central joining conduit portion 15 filled with a granular material 24, such as sand. The fittings 10, 12 are also joined on their respective ends to another conduit section 4, 8 containing conductors or cables 6. The conductors or cables pass through the first fitting, the joining conduit, and the second fitting, before traveling through a second conduit section. The granular material 24 prevents explosions within the conduit fitting from damaging the conductors or cables and the conduit itself, and the gas-tight fill 22 within the two fitting elements 10, 12 prevents explosive gasses from entering the fitting in the first place.

Fill ports 14 with threaded caps 16 allow for filling of the fittings 10, 12 once connected to the central joining conduit portion 14 to fill or remove the gas tight compound 22. The caps 16 have external threads 18 and the fill ports 14 have internal threads 20. The upper cap is used for filling the granular material 24 and gas tight compound 22.

III. Second Embodiment Explosion-Proof Conduit Fitting 102

Figure 7:
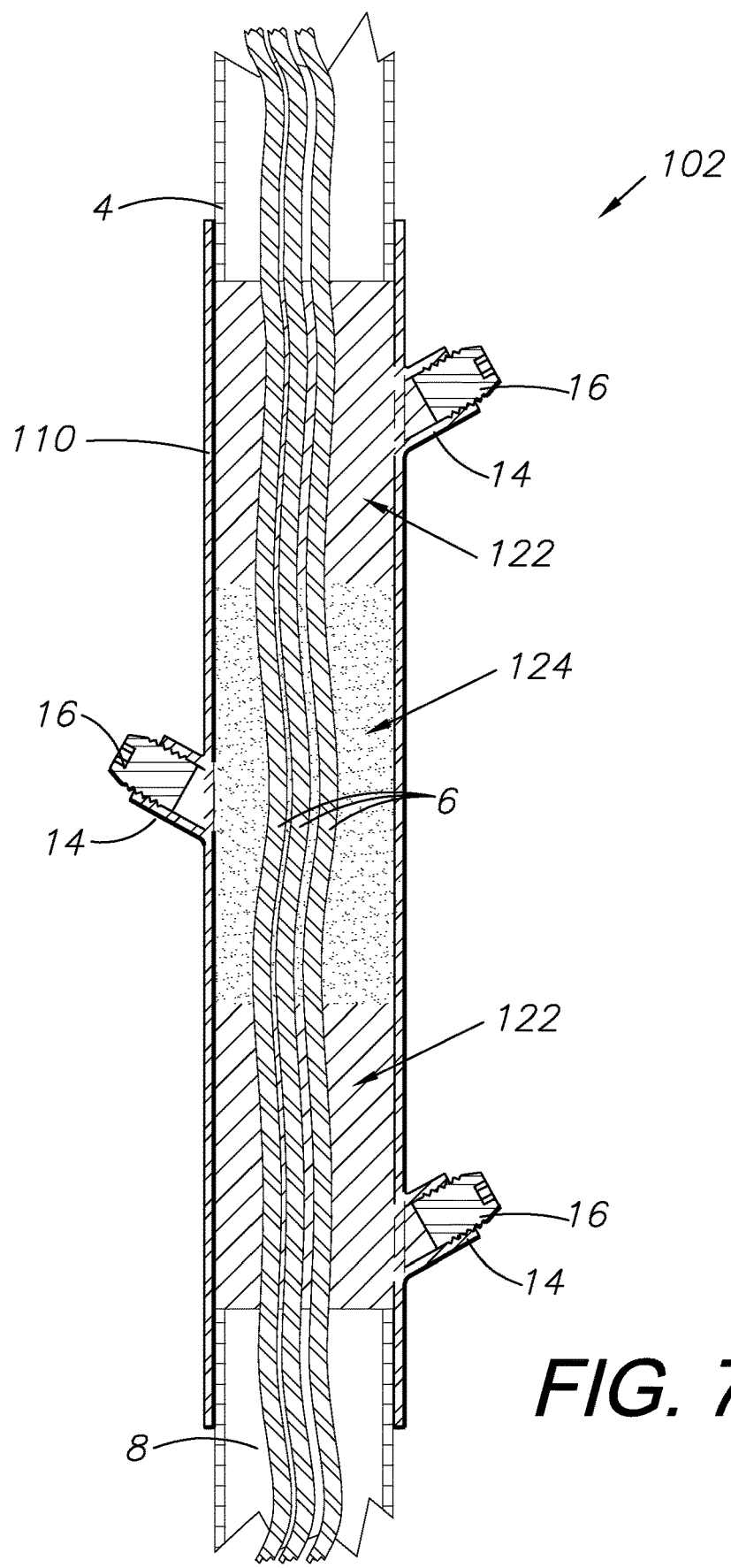
FIG. 7 is a side sectional view taken about the line of FIG. 5.
Figure 8:
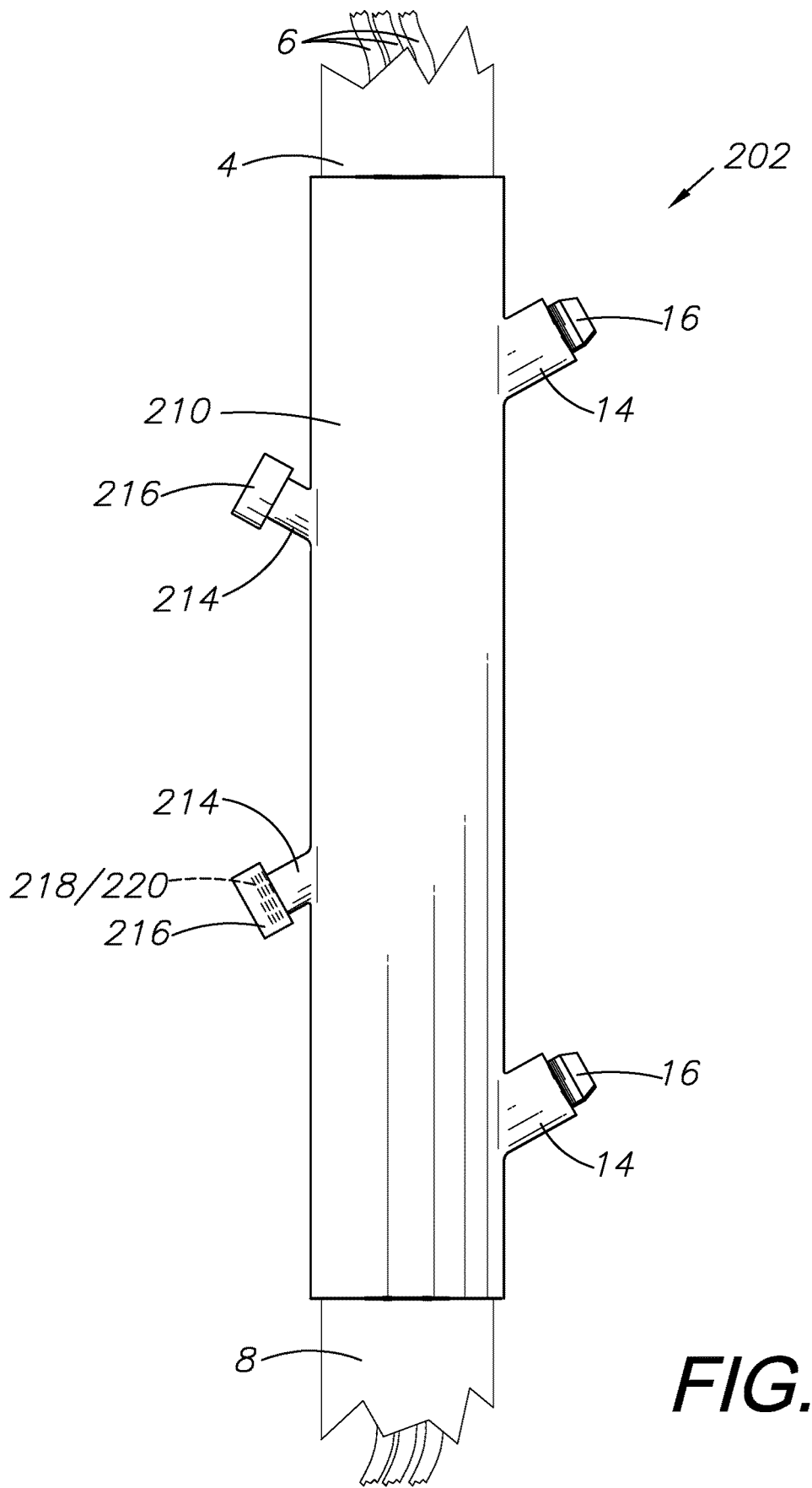
FIG. 8 is side elevational view of a third embodiment of the present invention.
Figure 9:
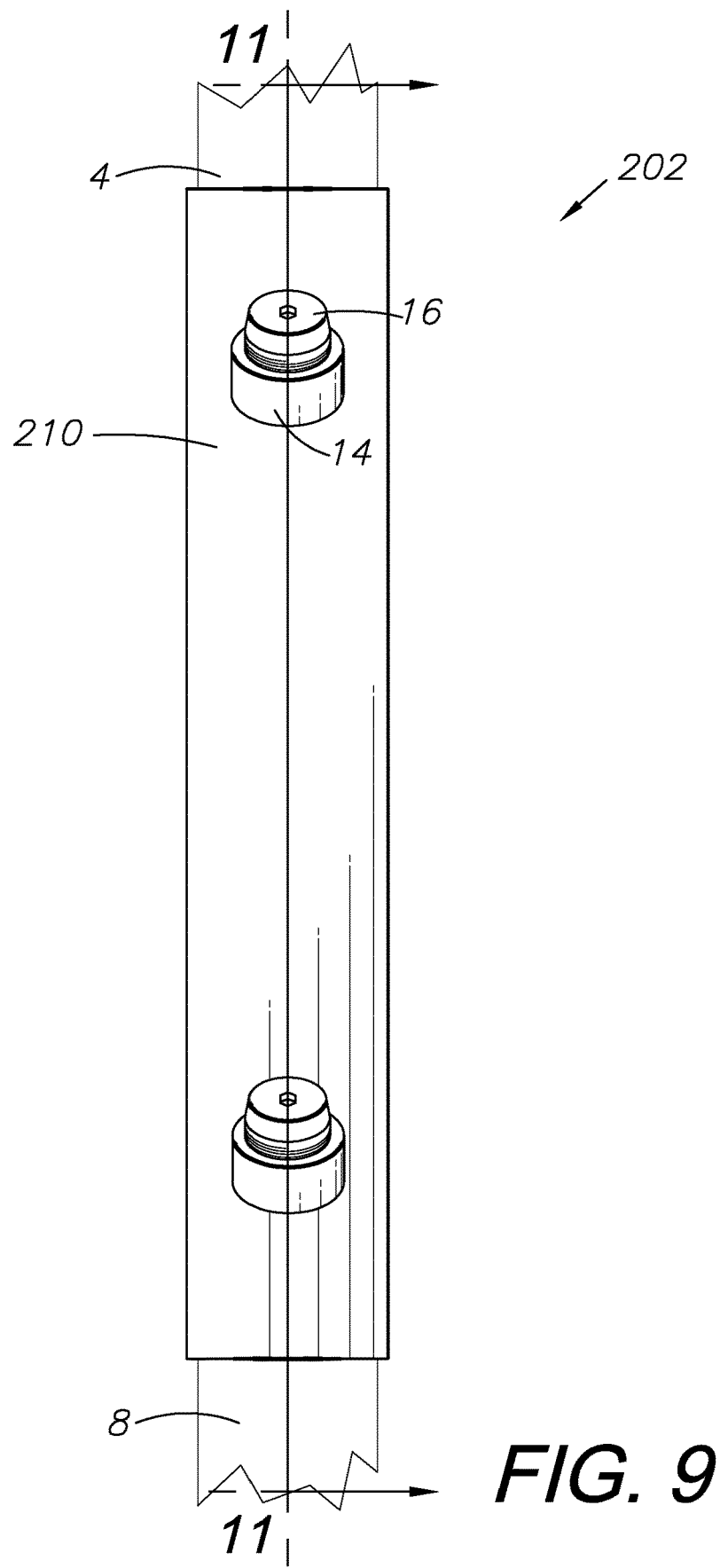
FIG. 9 is a top plan view thereof.
Figure 10:
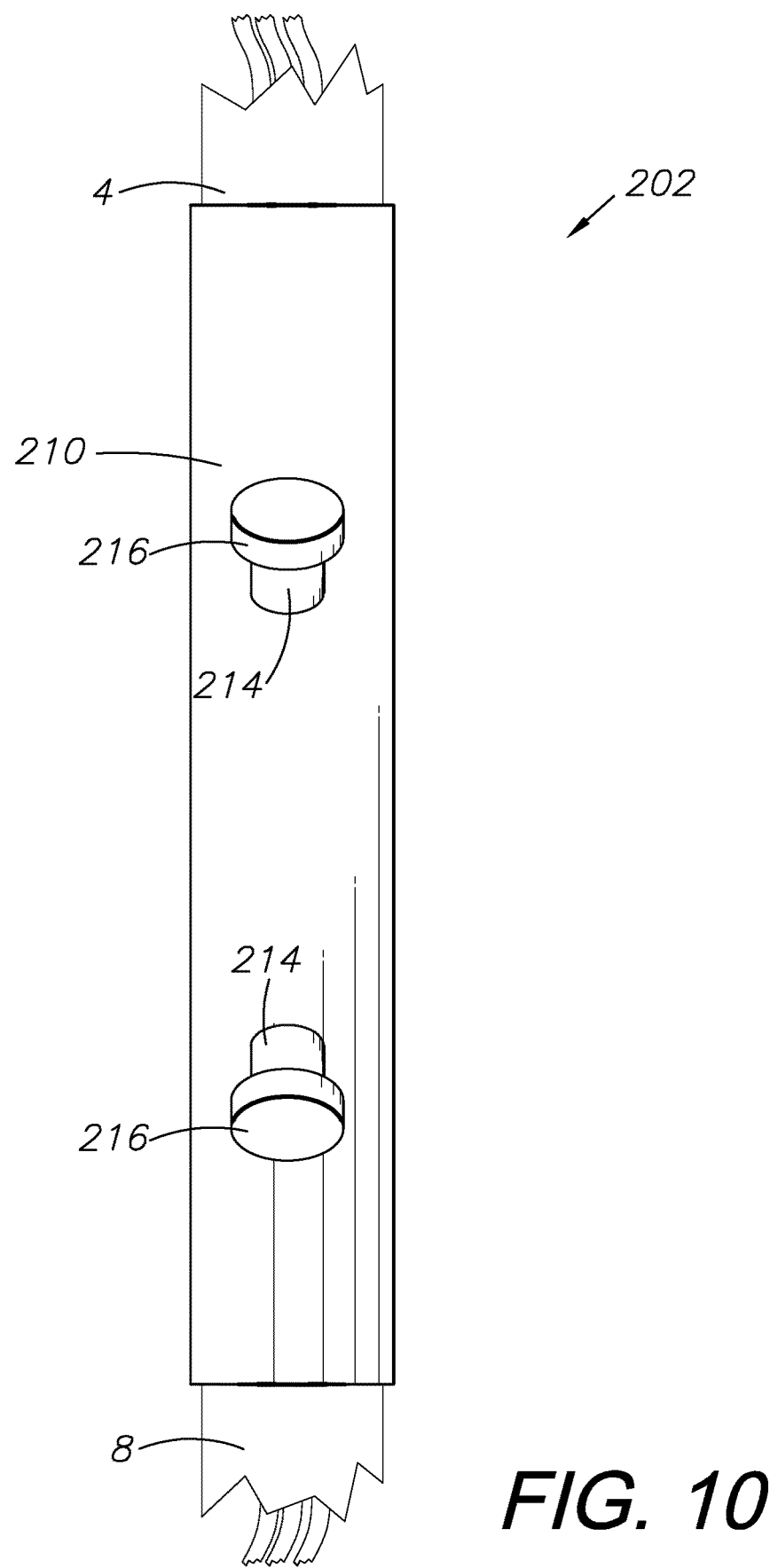
FIG. 10 is a rear plan view thereof.

FIGS. 4-7 show a second embodiment explosion-proof conduit fitting 102 wherein the joining conduit of the first embodiment is incorporated into a single fitting 110 having two ends joined by a central portion. Here, the ends can again be filled with the gas-tight compound 22 or the entire interior of the fitting 110 can be filled with a granular compound 124 and gas tight compound 122 as shown in FIG. 7. This embodiment removes the need for the central joining conduit portion of FIG. 1. As shown, this embodiment utilizes the same fill port 14 and cap 16 elements as the first embodiment, but any suitable fill port and cap arrangements could be utilized.

In a preferred embodiment, the gas-tight compound 122 is added to the bottom port of the fitting 102, after which the granular material 124 is added in the top port, after which the final portion of gas-tight compound is added on top.

IV. Third Embodiment Explosion-Proof Conduit Fitting 202

Figure 11:
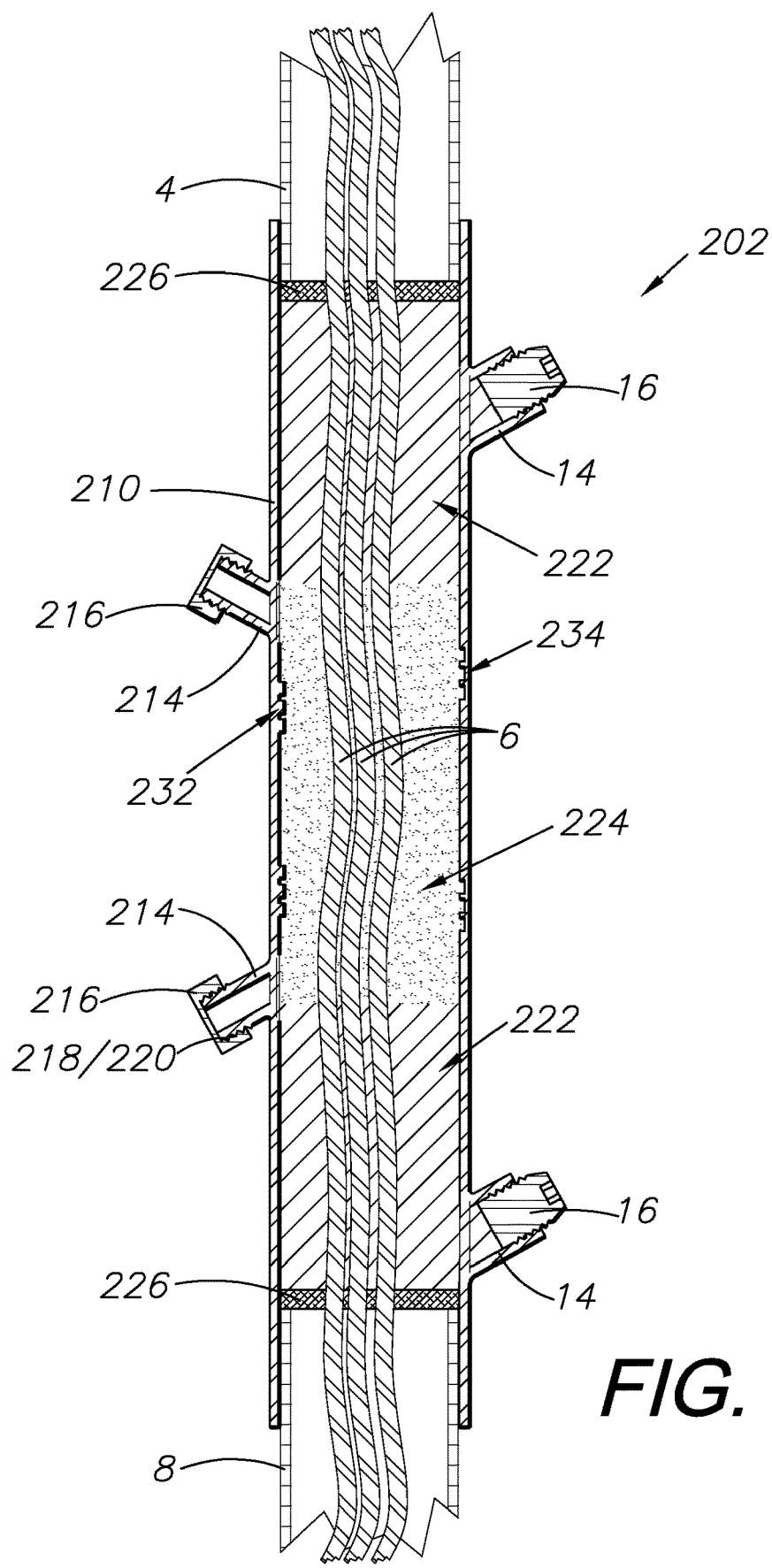
FIG. 11 is a side sectional view taken about the line of FIG. 9.

FIGS. 8-11 show a third embodiment explosion-proof conduit fitting 202 similar to the previous embodiment 102 having a single fitting 210. FIG. 11 shows a cross-sectional view of how the two ends of the fitting 210 are filled with a gas tight material 222 and the central portion is filled with a granular material 224. The granular material is added to the center portion through a pair of ports 214 having external threads 220 with the cap 216 having interior threads 218. This prevents the granular material 224 from interfering with the threads as would occur with interior threads used in the other port 14 and cap 16 arrangement. FIG. 11 also shows internal ridges 232 and/or grooves 234 within the fitting 210 which help to provide additional frictional force against the granular material 224, increasing its explosion-proof capabilities. An optional fiber backing 226 is placed on each end of the fitting 210 to stop the migration of the gas tight compound 222.

V. Fourth Embodiment Explosion-Proof Conduit Fitting 302

Figure 12:
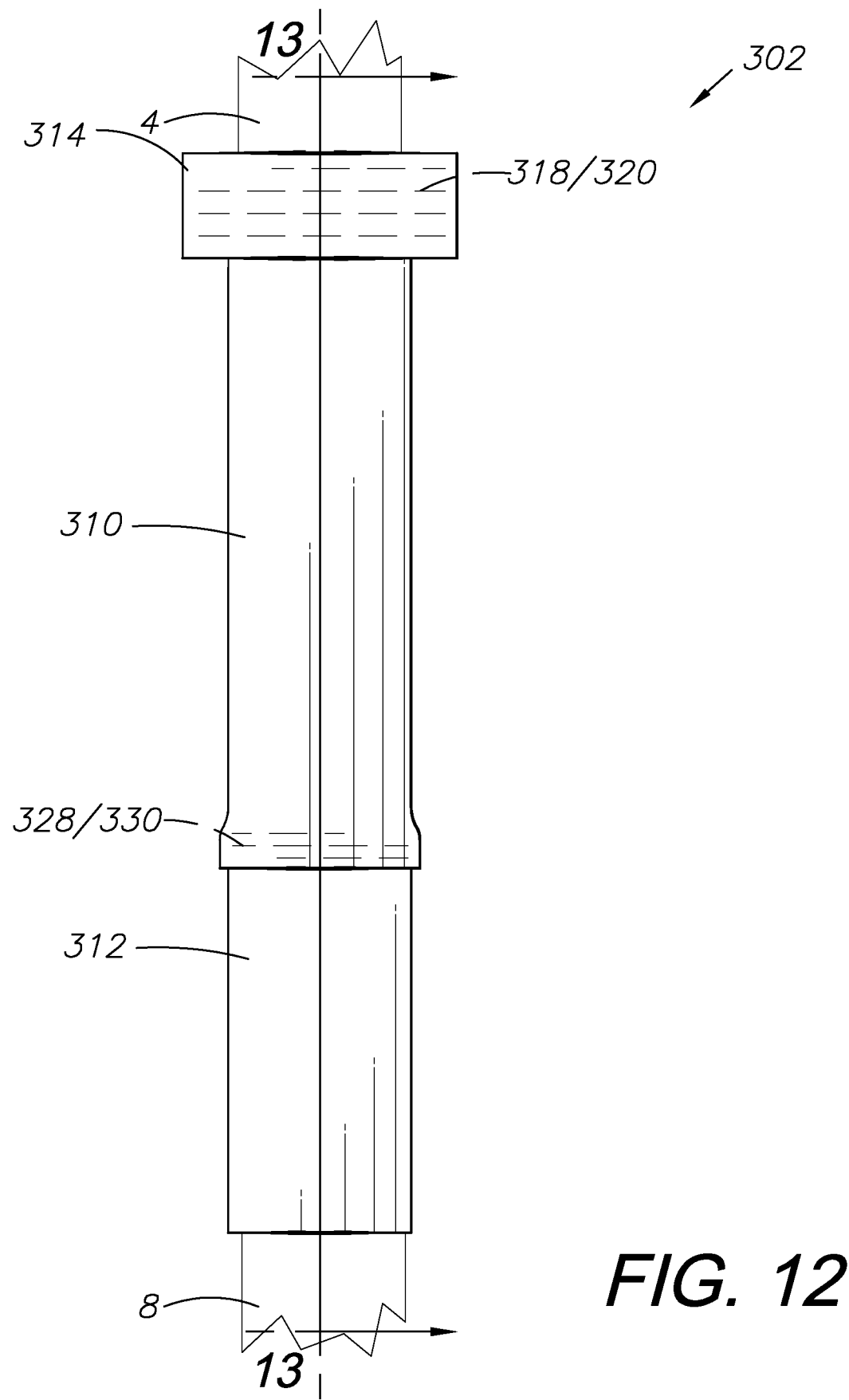
FIG. 12 is a top plan view of a fourth embodiment of the present invention.
Figure 13:
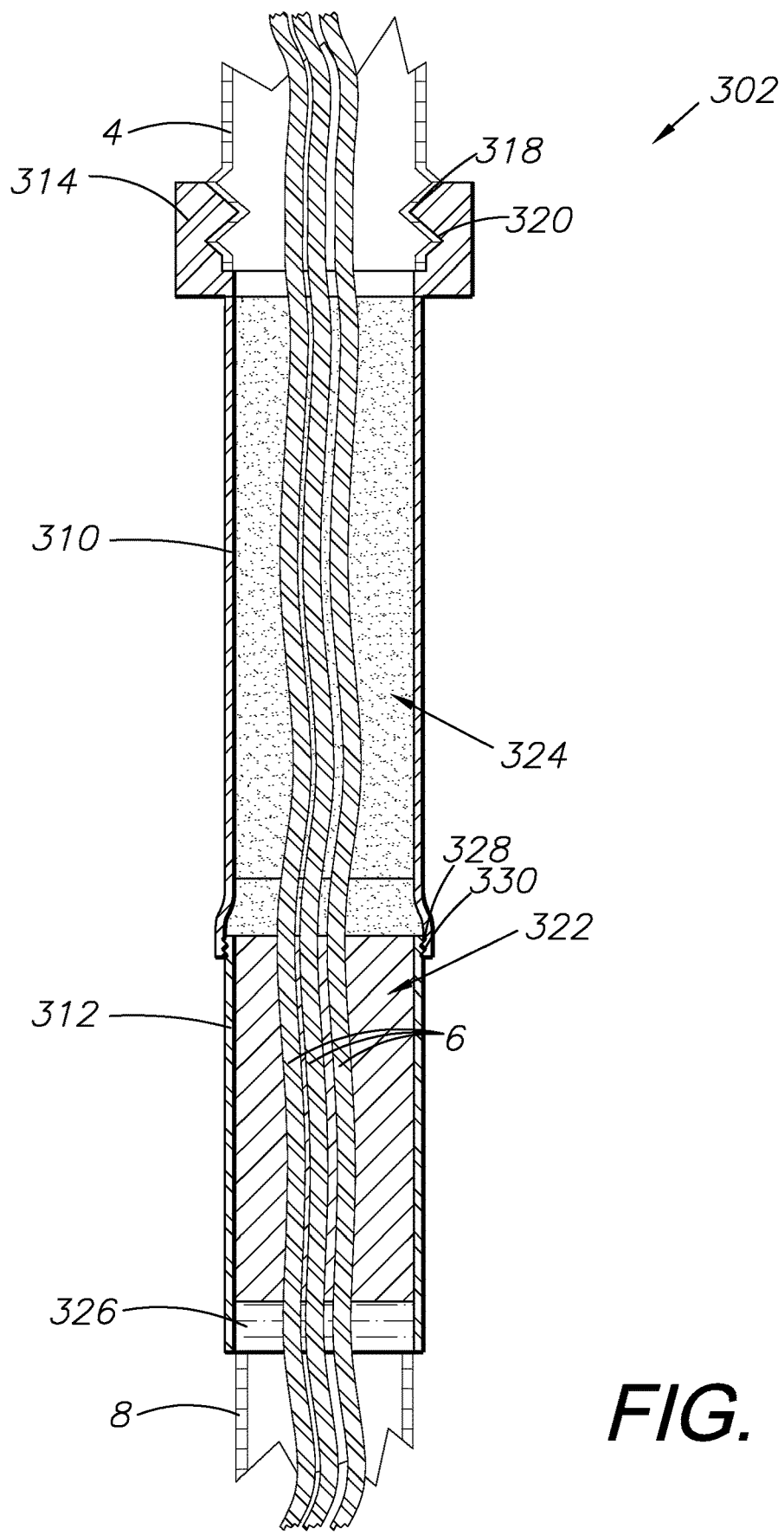
FIG. 13 is a side sectional view thereof taken about the line of FIG. 12.

FIGS. 12 and 13 show a fourth embodiment explosion-proof conduit fitting 302 formed from a first fitting 310 and a second fitting 312. The first fitting 310 is shown connecting to a conduit 4 using a threaded connector 312, although any connection type may be used. The two fittings are connected via internal threads 328 located inside of a flared-out end of the first fitting 310 and external threads 330 of the second fitting 312, however this is merely one example of how the fittings 310, 312 could be joined. A gas tight compound 322 fills the second fitting 312, while a granular material 324 fills the first fitting 310.

This configuration can be filled without filling ports by disassembling the coupling and pieces and sliding the pieces up or down, or sideways, to provide access to fill the fittings with granular fill and vapor tight foam.

This configuration also shows a threaded connector 314 which can threadedly connect the first fitting 310 to the conduit section 4 via internal threads 318 on the threaded connector 314 and external threads 320 on the conduit section 4.

The pieces and elements described herein can be manufactured from malleable iron rather than casting, which can allow more economical construction.

It is to be understood that while certain embodiments and/or aspects of the invention have been shown and described, the invention is not limited thereto and encompasses various other embodiments and aspects.

Having thus described the invention, what is claimed as new and desired to be secured by Letters Patent is:

1. An explosion-proof conduit fitting comprising:
   a first end portion, a second end portion, and a central portion;
   said first end portion and said second end portion being filled with an expanding foam configured to provide a gas-tight seal;
   said central portion filled with a granular material configured to dampen explosive forces; and
   wherein said first end portion and said second end portion connect to a respective first conduit section and second conduit section.

2. The explosion-proof conduit fitting of claim 1, wherein said first end portion, said second end portion, and said central portion are all portions of a unitary body.

3. The explosion-proof conduit fitting of claim 1, wherein the central portion comprises a length of conduit placed between said first end portion and said second end portion.

4. The explosion-proof conduit fitting of claim 1, further comprising at least one internal ridge located within said central portion, said at least one internal ridge configured to provide frictional resistance against said granular material, thereby increasing said granular material's ability to dampen explosive forces.

5. The explosion-proof conduit fitting of claim 1, further comprising:
  at least one access port configured for filling at least one of said first end portion, said second end portion, and said central portion with one or more of said expanding foam and said granular material; and
  a cap configured to seal said at least one access port.

6. The explosion-proof conduit fitting of claim 5, further comprising:
  said at least one access port comprising exterior threads;
  said cap comprising interior threads; and
  wherein said cap and said at least one access port are threadedly engaged via said exterior threads and said interior threads.

7. The explosion-proof conduit fitting of claim 5, further comprising:
  said at least one access port comprising interior threads;
  said cap comprising exterior threads; and
  wherein said cap and said at least one access port are threadedly engaged via said interior threads and said exterior threads.

8. The explosion-proof conduit fitting of claim 1, further comprising:
  a first fiber backing located at a terminal end of said first end portion;
  a second fiber backing located at a terminal end of said second end portion; and
  wherein said first fiber backing and said second fiber backing are configured to prevent migration of said expanding foam past said respective terminal ends of said first end portion and said second end portion.

9. The explosion-proof fitting of claim 1, wherein at least one conductor passes from said first conduit section through said explosion-proof fitting and through said second conduit section.

10. The explosion-proof conduit fitting of claim 1, wherein said first end portion is engaged with said first conduit section via a threaded connector.

11. The explosion-proof conduit fitting of claim 1, wherein said second end portion is threadedly engaged with said central portion.

12. An explosion-proof conduit fitting comprising:
  a first portion and a second portion;
  said first portion filled with a granular material configured to dampen explosive forces;
  said second portion being filled with an expanding foam configured to provide a gas-tight seal;
  said first portion and said second portion connect to a respective first conduit and second conduit;
  said first portion threadedly connected to said second portion; and
  said first portion connected to said first conduit via a threaded connector.

13. A method of installing an explosion-proof conduit fitting, the method comprising the steps:
  providing a first conduit section and a second conduit section;
  providing an explosion-proof conduit fitting having a first end portion, a second end portion, and a central potion;
  connecting said first end portion to said first conduit section;
  connecting said second end portion to said second conduit section;
  filling said first end portion and said second end portion with an expanding foam configured to provide a gas-tight seal;
  filling said central portion with a granular material configured to dampen explosive forces; and
  providing at least one conductor configured to pass through said first conduit section, through said explosion-proof conduit fitting, and said second conduit section.

14. The method of claim 13, further comprising the steps:
  providing at least one access port configured for filling at least one of said first end portion, said second end portion, and said central portion with one or more of said expanding foam and said granular material; and
  sealing said at least one access portion with a cap.

15. The method of claim 13, further comprising the step:
  installing a fiber backing between said expanding foam and said first conduit section.

* * * * *